No. 732,624. PATENTED JUNE 30, 1903.
H. C. FARRIS.
COMBINED CULTIVATOR AND HARROW.
APPLICATION FILED NOV. 17, 1902.
NO MODEL.
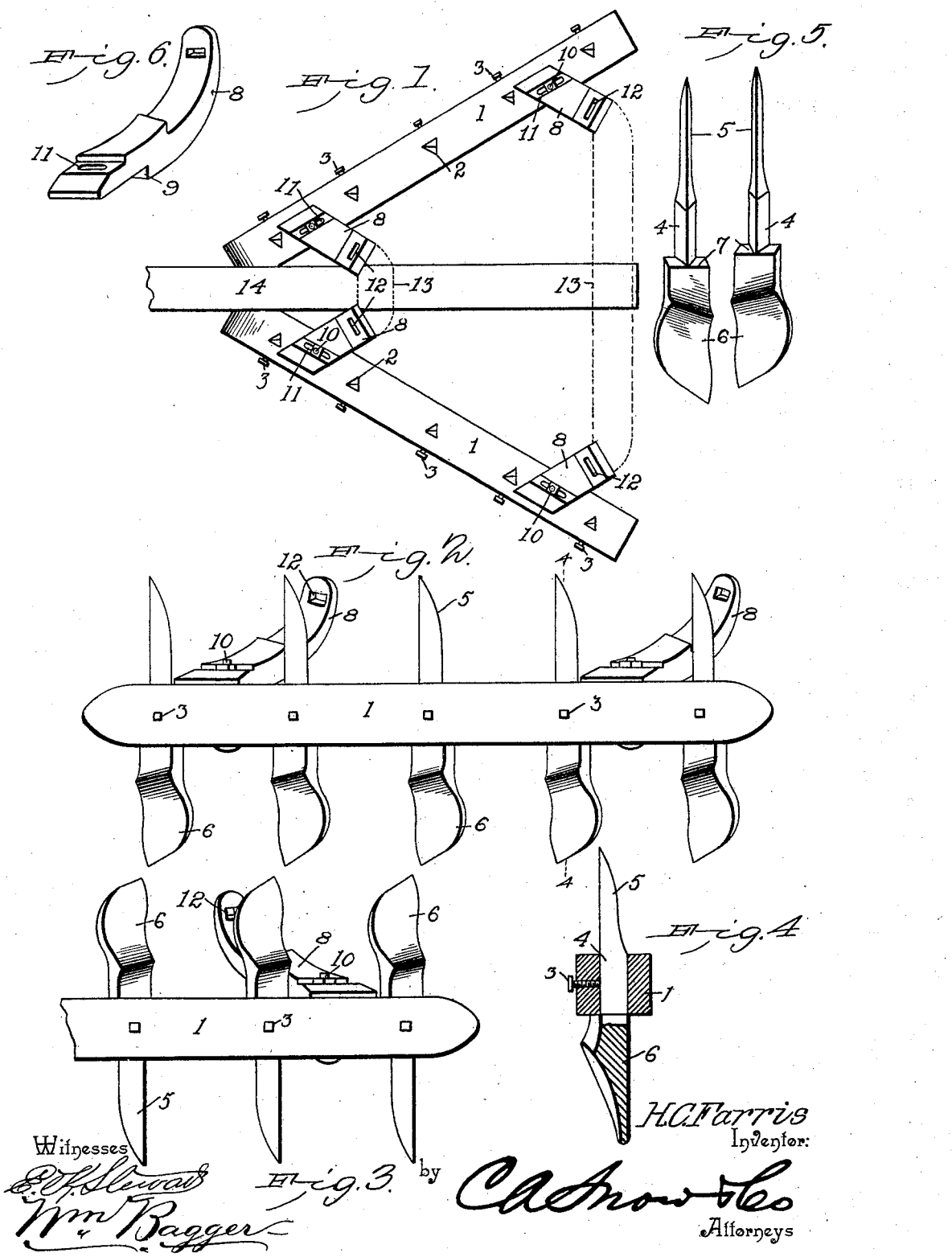

No. 732,624. Patented June 30, 1903.

UNITED STATES PATENT OFFICE.

HENRY CLAY FARRIS, OF ANDREWS, TEXAS.

COMBINED CULTIVATOR AND HARROW.

SPECIFICATION forming part of Letters Patent No. 732,624, dated June 30, 1903.

Application filed November 17, 1902. Serial No. 131,747. (No model.)

*To all whom it may concern:*

Be it known that I, HENRY CLAY FARRIS, a citizen of the United States, residing at Andrews, in the county of Wood and State of Texas, have invented a new and useful Combined Cultivator and Harrow, of which the following is a specification.

This invention relates to an improved agricultural implement comprising in its construction a cultivator and a harrow, the tooth elements of which are so constructed and supported by the frame as to be capable of being adjusted for operation in several different positions, according to the use to which it is desired to put the implement. Thus the said teeth may be adjusted for cultivating purposes to throw the dirt either toward or from a central ridge, while by reversing the teeth in their sockets the implement may be converted into a harrow.

My invention has for its object to provide an implement of the class referred to which shall possess superior advantages in point of simplicity, durability, and general efficiency; and with these ends in view it consists in the improved construction, arrangement, and combination of parts, which will be hereinafter fully described, and particularly pointed out in the claim.

In the accompanying drawings, Figure 1 is a top plan view of an implement constructed in accordance with the principles of my invention. Fig. 2 is a side elevation, on a larger scale, of one of the frame-bars, showing the tooth elements mounted therein in position for cultivating the soil. Fig. 3 is a side view of a portion of the frame-bar, showing the tooth elements in a reversed position from Fig. 2, exposing the harrow-teeth for operation. Fig. 4 is a vertical sectional view taken on the line 4 4 in Fig. 2. Fig. 5 is a perspective detail view showing a pair of the tooth elements detached from the frame. Fig. 6 is a perspective detail view of one of the supporting-brackets.

Corresponding parts in the several figures are indicated by similar numerals of reference.

The frame-bars 1 of my improved implement, which are two in number, are each provided with a plurality of equidistant vertical perforations 2, which are triangular in cross-section, the sides being equal. These triangular perforations are disposed with their outer sides parallel to the front or outer side of the bar in which they are formed. The frame-bars are provided with transverse openings registering with the outer sides of the triangular perforations 2 and carrying set-screws 3.

The tooth elements of the device are provided with shanks 4, equilateral triangular in cross-section and of a length equal to the thickness of the frame-bars 1, in the triangular perforations of which the said shanks are closely fitted and where they may be tightly secured by means of the set-screws 2. The shanks 4 are extended in one direction to form the harrow-teeth 5, and at their opposite ends they are provided with the cultivator shovels or blades 6, which are made right and left to correspond with the sides of the device. It is obvious that by exchanging these shovels from one of the frame-beams to the other they will be caused to throw the dirt in either direction, as may be desired. The blades or shovels are provided at their upper ends with shoulders 7, adapted to abut upon the upper or lower sides of the frame-beams, according to the position in which the elements are used, as will be clearly seen by reference to Figs. 2 and 3 of the drawings.

The frame-beams 1 1 are provided near their front and rear ends with upwardly and rearwardly extending brackets 8, which are curved, as will be best seen in Figs. 2 and 6, and provided with shoulders 9, abutting upon the inner sides of the frame-beams, so as to be retained securely in position by means of the connecting-bolts 10, that engage slots 11 in the said brackets, which are thus made capable of longitudinal adjustment with relation to the frame-beams. The upper ends of the brackets 8 are likewise provided with slots 12 for adjustable connection with the cultivator feet or brackets. In Fig. 1 of the drawings these feet have been indicated at 13 in dotted lines as consisting of cross-bars mounted transversely upon a draft-beam 14; but I would have it understood that the members which constitute my improved attachment may be mounted for operation in connection with a riding-cultivator or with a machine-frame of any suitable construction.

It is obvious that the frame-bars of my device are to be so disposed with relation to each other as to converge toward the front of the conventional V shape. Apart from this the relative adjustment or disposition of said parts may be altered or modified to any extent within the scope of my invention.

The operation and advantages of this device will be readily understood from the foregoing description, taken in connection with the drawings hereto annexed. By shifting the tooth members from one side of the frame to the other the device, used as a cultivator, will throw the dirt in the direction toward or from a central ridge, as may be desired, according to the work that is to be performed. By reversing said elements in their respective perforations or sockets the device will be converted into a harrow, as will be readily understood by reference to Fig. 3 of the drawings. The necessary scope of adjustment for the successful operation of the device under all circumstances is insured by the slots 11 and 12 in the brackets 8. The triangular shape of the shanks of the tooth elements and their receiving sockets or perforations insures that the said elements will always be mounted at exactly the proper angle, whether transferred from one frame-beam to the other or reversed, as the case may be.

While I have in the foregoing described the preferred form and construction of my invention, I desire it to be understood that I do not limit myself with regard to the structural details of the same, to the sizes or relative proportions of the parts, to the material employed in the construction of the parts, or in other respects within the scope of my invention; but I reserve the right to any changes, alterations, and modifications that may be resorted to without departing from the spirit of my invention or sacrificing the utility of the same.

Having thus described my invention, I claim—

In a device of the class described, a pair of converging frame-beams having tooth elements, and curved supporting-brackets having shoulders abutting upon the frame-beams and slots at their upper and lower ends for adjustable connection with said frame-beams and with suitable supporting means by means of connecting-bolts.

In testimony that I claim the foregoing as my own I have hereto affixed my signature in the presence of two witnesses.

HENRY CLAY FARRIS.

Witnesses:
THOMAS J. GOODWIN,
JAS. T. SMITH.